US007758063B2

(12) United States Patent
Johnson et al.

(10) Patent No.: US 7,758,063 B2
(45) Date of Patent: Jul. 20, 2010

(54) STABILIZED MOBILE UNIT OR WHEELCHAIR

(75) Inventors: Charles E. Johnson, Rogersville, TN (US); Phillip N. Brown, Rogersville, TN (US)

(73) Assignee: Life Changing Chair, LLC, Rogersville, TN (US)

( * ) Notice: Subject to any disclaimer, the term of this patent is extended or adjusted under 35 U.S.C. 154(b) by 0 days.

(21) Appl. No.: 11/835,963

(22) Filed: Aug. 8, 2007

(65) Prior Publication Data

US 2008/0129006 A1 Jun. 5, 2008

Related U.S. Application Data

(60) Provisional application No. 60/836,293, filed on Aug. 8, 2006.

(51) Int. Cl.
*B62B 7/06* (2006.01)

(52) U.S. Cl. .................................... 280/647; 280/650

(58) Field of Classification Search ................ 180/65.1, 180/907, 908; 280/638, 639, 642, 647, 650, 280/47.38, 47.4, 38, 643, 648, 657, 43, 43.15, 280/43.16, 47.41

See application file for complete search history.

(56) References Cited

U.S. PATENT DOCUMENTS

| | | | | | |
|---|---|---|---|---|---|
| 3,882,949 | A | * | 5/1975 | Anderson | 180/8.2 |
| 4,079,990 | A | * | 3/1978 | McMunn et al. | 297/69 |
| 4,613,151 | A | * | 9/1986 | Kielczewski | 280/650 |
| 5,011,175 | A | * | 4/1991 | Nicholson et al. | 280/304.1 |
| 5,259,664 | A | | 11/1993 | Cottle | |
| 5,333,887 | A | * | 8/1994 | Luther | 280/250.1 |
| 5,601,302 | A | * | 2/1997 | Beard et al. | 280/250.1 |
| 5,730,236 | A | | 3/1998 | Miller et al. | |
| 5,772,237 | A | * | 6/1998 | Finch et al. | 180/65.1 |
| 6,530,445 | B1 | * | 3/2003 | Flowers et al. | 180/208 |
| 7,100,718 | B2 | * | 9/2006 | Bancroft | 180/65.1 |
| 7,360,840 | B2 | | 4/2008 | Barlow et al. | |
| 2005/0116440 | A1 | | 6/2005 | Bernatsky et al. | |

OTHER PUBLICATIONS

International Search Report for Application PCT/US09/02757, with related Notification and Written Opinion (Jun. 30, 2009).

(Continued)

*Primary Examiner*—Jeffrey J Restifo
(74) *Attorney, Agent, or Firm*—Kilyk & Bowersox, P.L.L.C.

(57) ABSTRACT

A mobile vehicle or wheelchair having the ability to provide stabilized transport to at least one individual on a variety of surfaces, slopes and/or terrains. The mobile unit or wheelchair of the invention may travel across smooth and very rough surfaces, slopes of varying or different angles and various outdoor terrains (including grassy, rocky, sandy, muddy and/or hilly terrains). In one aspect of the invention, the height of any part of the unit or the overall height of the device may be adjusted preferably to raise or lower the center of gravity. For example, the height of the device may be lowered to provide more stable transportation. In another aspect, the device may be adjusted to increase or decrease the size of the footprint (or any part of the footprint) of the device. For example, the footprint of the device may be enlarged to provide more stable transportation. Preferably, both the height of the device (or any part of the device) and the size of the footprint (or any part of the footprint) may be adjusted preferably to provide more stability.

24 Claims, 12 Drawing Sheets

OTHER PUBLICATIONS

International Preliminary Report on Patentability and International Search Report for corresponding Application PCT/US2007/017549, with related Notification and Written Opinion (IPRP dated Feb. 10, 2009).

* cited by examiner

Fig. 10
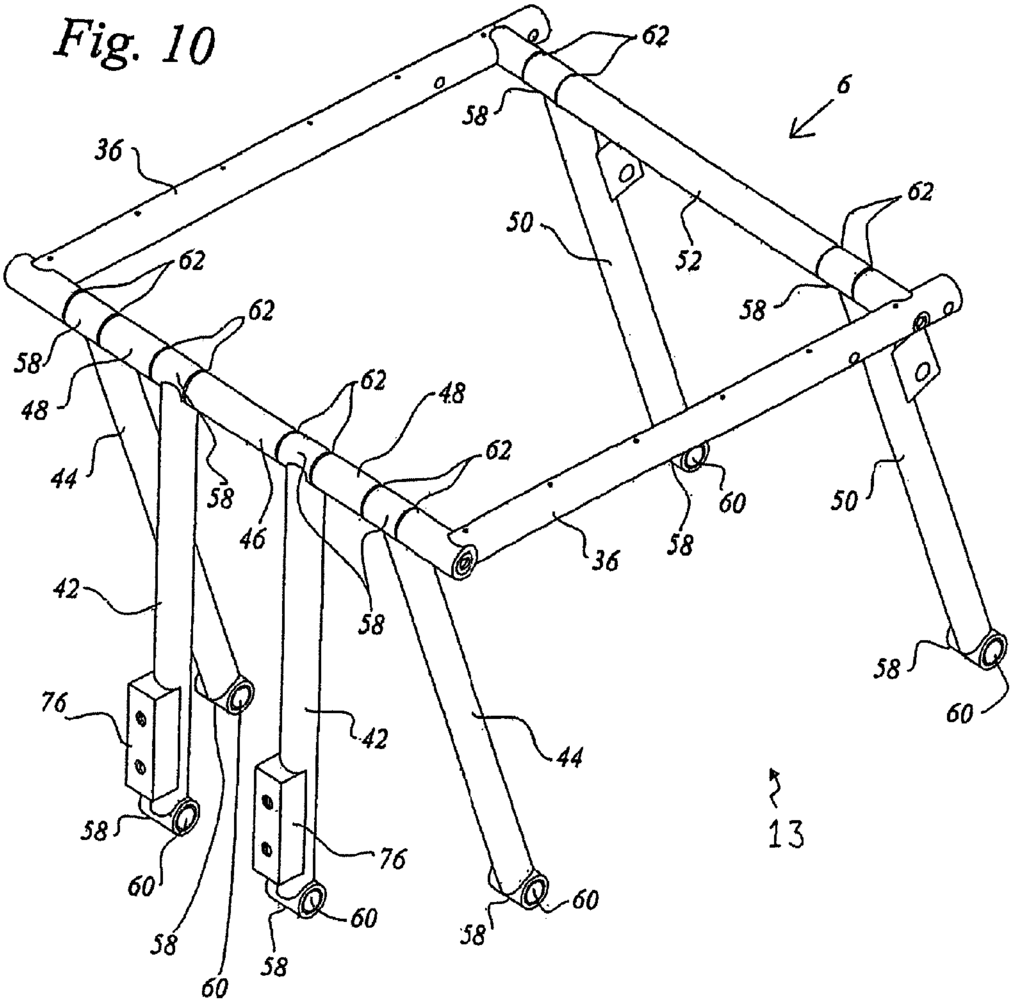
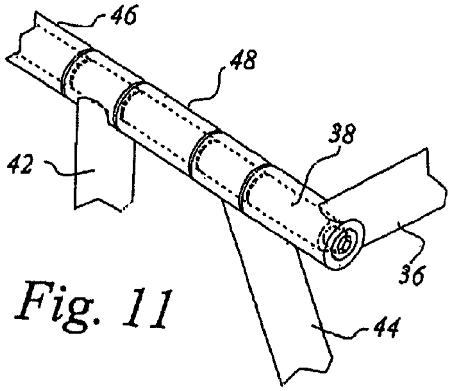
Fig. 11
Fig. 12
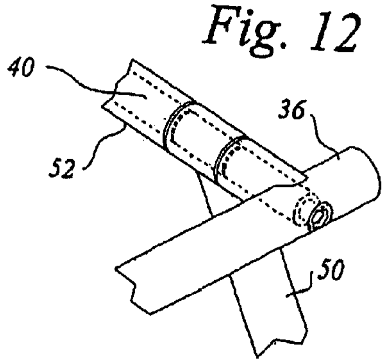

Fig. 15
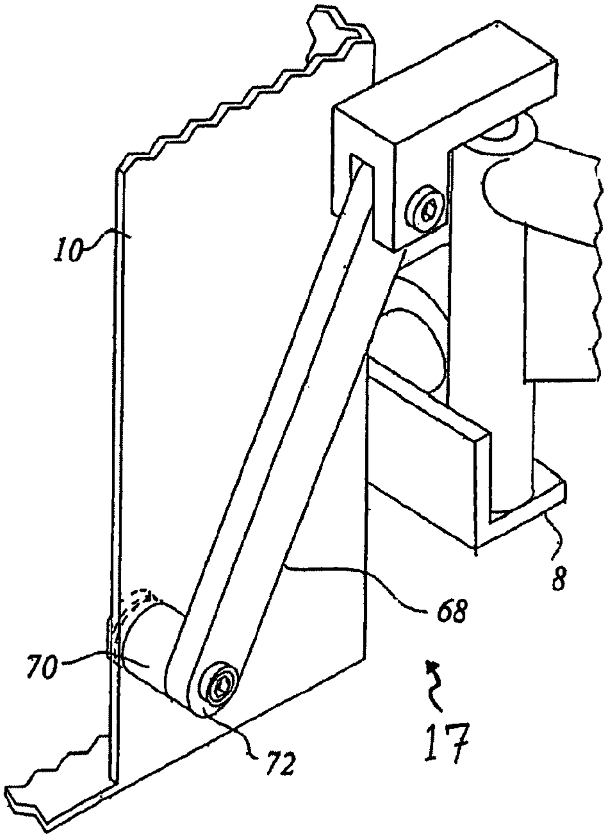
Fig. 16
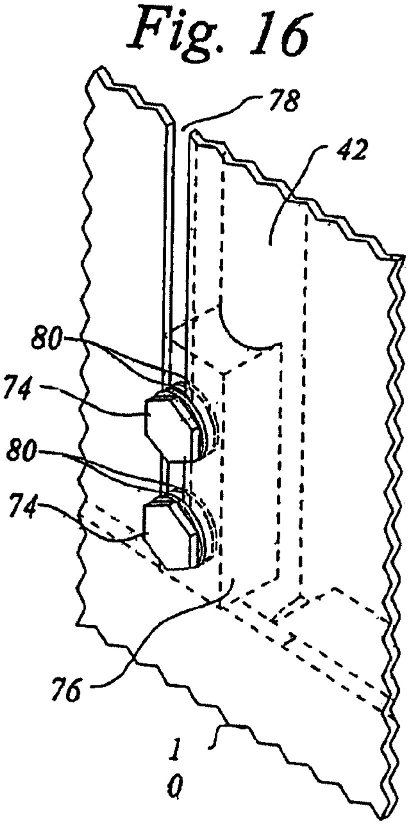
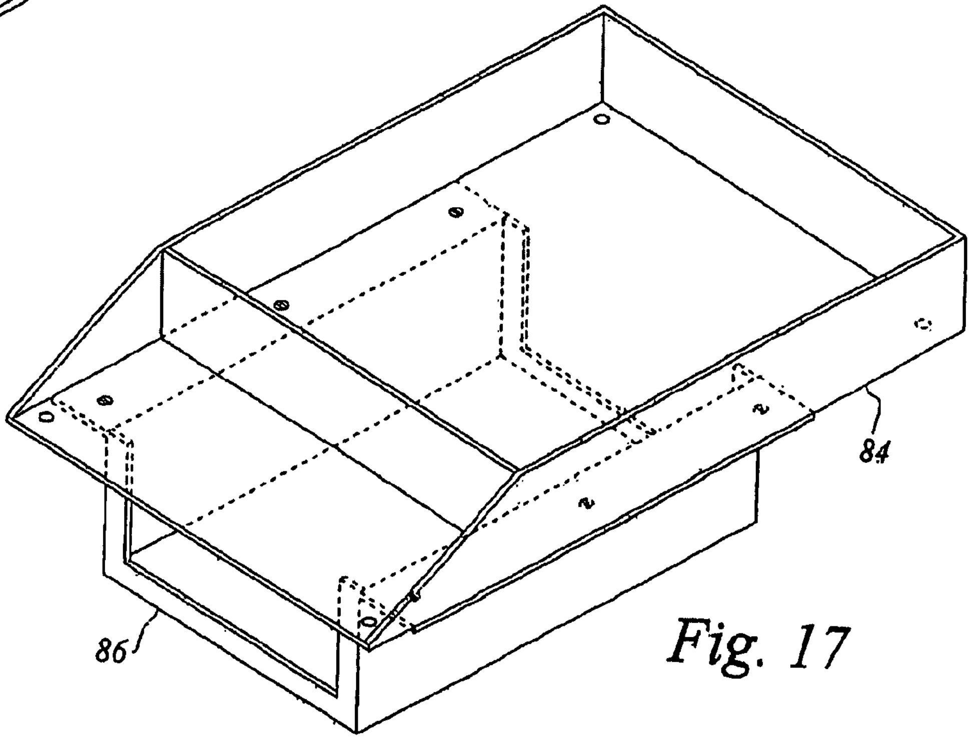
Fig. 17

STABILIZED MOBILE UNIT OR WHEELCHAIR

CROSS REFERENCE TO RELATED APPLICATIONS

This application claims the benefit of U.S. Provisional Application No. 60/836,293, filed Aug. 8, 2006, the disclosure of which is incorporated by reference herein.

BACKGROUND OF THE INVENTION

1. Field of the Invention

The present invention is directed to a mobile vehicle or wheelchair having the ability to provide stabilized transport to at least one individual on a variety of surfaces, slopes and/or terrains.

2. Background Art

Wheelchairs have proven to be the most practical solution to mobility for individuals that have problems walking, due to age, sickness, and/or disabilities. While both conventional and motorized wheelchairs provide improved mobility to such individuals, current designs fail to adequately address the need of the individual to have broad access to various locations. In particular, current designs pose hazards to the occupant when operated on sloped and/or uneven surfaces. Current designs also fail to address various medical issues for certain individuals including poor circulation. Moreover, little has been done to provide an affordable design allowing broader availability.

The present invention addresses these and other needs.

BRIEF SUMMARY OF THE INVENTION

The present invention relates in general to a mobile unit, a vehicle, a mobile device and/or wheelchair which provides stabilized transportation for one or more passengers. In one aspect of the invention, the height of any part of the unit or the overall height of the device may be adjusted preferably to raise or lower the center of gravity, and in a preferred aspect, the height of the device is lowered to provide more stable transportation for the user of the invention. In another aspect, the device may be adjusted to lengthen or shorten the base of the device, and in a preferred aspect, the base of the device is lengthened to provide more stable transportation for the user of the invention. Preferably, both the height of the device (or any part of the device) and the length of the base (or any part of the footprint) may be adjusted to provide more stability.

In one embodiment, the wheelbase of the wheelchair extends or retracts to vary the size of the footprint, while the height of the seat member of the wheelchair increases or decreases, which varies the location of the center of gravity.

In another embodiment, the base of the wheelchair extends or retracts to vary the size of the footprint, while the height of the seat member of the wheelchair increases or decreases, which varies the location of the center of gravity. The location of the center of gravity as well as the size of the footprint may contribute to the stability of the wheelchair, and through their adjustment the stability can be increased or decreased. In one aspect, while the height of the seat member pivots to a decreased height, leg rests pivot and extend from the main frame to support a user's legs throughout transition.

In another embodiment, the base of the wheelchair extends or retracts to vary the size of the footprint, while the height of the seat member of the wheelchair increases or decreases, which varies the location of the center of gravity. In one aspect, the seat member is adjustable between an upright and a lowered position, while the base is adjustable between a compacted and an extended position. In one aspect, when the seat member in an upright position, and the base is in a compacted position, the wheelchair is suited to support a user sitting upright, legs bent at the knee. This position is conducive to indoor use, as the smaller footprint of the device and higher seat member in this configuration makes it easy to maneuver in an indoor environment, among other benefits. When the seat member is in a lowered position, and the base is in an extended position, the wheelchair is suited to support a user sitting in a reclined straight-leg (or substantially straight-leg) seated position. This position is conducive to outdoor use, as the lengthened wheelbase, larger footprint and lowered seat member in this configuration provide for greater stability in traveling over potentially uneven terrain, among other benefits.

In one embodiment, the relative movement of the base (or one or more wheels as part of the base configuration) and the lowering of the seat allows the center of gravity of the user/unit combination to be lowered and thus provides more stability for the operation of the unit by the user. The combination of lowering the seat and increasing the size of the footprint allows the user to sit in a relatively flat position. Preferably the operation of the invention allows the legs of the user to be extended (preferably the legs being flat or substantially flat). This feature of the invention allows the user's legs to extend in such a manner as to provide comfort to the user and/or increase blood circulation in the user's legs.

The invention is particularly suited for use by handicapped individuals or any user who desires aid in moving from place to place. In a preferred aspect, the device of the invention comprises a base or platform (which may be prepared of any material such as metal, plastic, wood and the like or combinations thereof, and can be designed in various configurations such as a frame, a solid platform and the like or combinations thereof). In another aspect, the base or platform (or any part of the base or platform) may be adjusted to increase or decrease the size of the footprint of the base or platform. In a preferred embodiment, the footprint is increased in size to provide more stability to the unit. Preferably, the size of the footprint may be increased by extending one or more portions of the base or platform. Such one or more portions may be extended or retracted, for example, by utilizing extension/retraction tracks and/or extension/retraction rods and/or extenders that allow two or more parts of the base or platform to separate and move away from or toward each other in such a manner to allow the overall footprint size of the base to increase or decrease.

In yet another aspect, the base or platform comprises a plurality of wheels, wherein the wheels may be designed (including various shapes, sizes and/or tread configurations) to accommodate any terrain. Preferably, the invention utilizes any number of wheels including at least two, at least three, at least four, at least five, at least six, at least seven, at least eight or more wheels depending on the need. In another aspect, the size of the footprint of the base may be increased or decreased by extending or retracting one or more wheels which may be included as part of the base or platform configuration. For example, one or more wheels may be extended or retracted, for example, by utilizing one or more extension/retraction tracks and/or extension/retraction rods and/or extenders that allow at least one wheel to separate and move away from or toward the base or platform in such a manner to allow the overall footprint size of the base or platform to increase or decrease.

In another aspect, the invention may be powered or moved manually by an individual or user or may be motorized (such as by one or more electric and/or combustion motors or combinations thereof). In yet another aspect, any one or a number of the wheels of the device may be powered by such one or more motors and preferably the unit of the invention is a multi-wheel drive unit, wherein a number or all of the wheels of the unit are driven by one or more drive motors. Preferably, the device of the invention comprises four (4) wheels and preferably at least two of such wheels (and preferably all four) are capable of being driven by one or more motors. In another embodiment, one or more motors of the invention are utilized to raise and/or lower all or any part of the unit. In another aspect, one or more motors are utilized to increase and/or decrease the size of the footprint of the unit (or any part of the unit). In another embodiment, the same or different motors may be used to operate all or any number of the functions of the unit, and in a preferred aspect one motor is utilized to move the device, to increase and/or decrease the size of the footprint (or any part of the footprint) and to raise and/or lower all or any part of the unit. In utilizing the unit of the invention, the different functions of the device may be operated separately or simultaneously depending on the need of the user. When one or more motors provide operation of any or all of the features of the unit, the unit may also comprise one or more control devices allowing the user to control and operate the different features of the invention. For example, one or more control panels may be used to move the unit, adjust the size of the footprint and/or adjust the center of gravity.

The device of the invention preferably comprises at least one seat or chair unit, and in a preferred aspect, the seat or chair may be adjusted to provide more comfort and/or stability for the user. In a preferred aspect, the at least one chair or seat may be adjusted up or down relative to the base or platform. Preferably, the chair or seat is lowered to provide more stability. Lowering the chair or seat according to the invention also provides better access to ground level activities, while increasing the height of the chair or seat provides better access to off the ground activities, such as easy access to table tops and counters. In a preferred aspect of the invention, the chair or seat is lowered by moving it generally forward relative to the front of the unit or the front of the chair, preferably by pivoting the seat such that it is lowered as it moves forward. In a different aspect, the chair or seat is lowered by moving it generally back away from the front of the unit or relative to the front of the chair, preferably by pivoting the seat such that it is lowered as it moves back. In another aspect, the seat or chair is lowered by moving it down with little or no general movement forward or backward relative to the base of the unit.

In a preferred embodiment of the invention, both the chair/seat adjustment and the footprint size adjustment may be operated simultaneously or separately. Preferably, the chair/seat is lowered and the size of the footprint is increased and this operation provides the unit with more stability during operation. In one aspect, the seat/chair is lowered by moving it forward relative to the base or relative to the front of the chair, and the front of the base (or one or more wheels of the base configuration) is extended. In another aspect, the seat/chair is lowered by moving it back relative to the base or relative to the front of the chair, and the back of the base (or one or more wheels of the base configuration) is extended. In a different aspect, the chair may be lowered backwards while the front of the base (or one or more wheels of the base configuration) is extended. In a related aspect, the chair may be lowered by moving it forward while the back of the base (or one or more wheels of the base configuration) is extended. As will be apparent, one or multiple parts of the base (or one or more wheels of the base) may be extended as the chair/seat is adjusted.

BRIEF DESCRIPTION OF THE DRAWINGS/FIGURES

The advantages and features of the present invention will become better understood with reference to the following more detailed description and claims taken in conjunction with the accompanying drawings, in which like elements are identified with like symbols, and in which:

FIG. 10 is a pictorial view of the seat member or seat support which when operated pivots forward or backward to allow it to move up or down.

FIG. 11 is a partial section and view of the forward connection of the seat member or seat support showing various pivot points allowing movement of the support up or down.

FIG. 12 is a partial section and view of the rearward connection of the seat member or seat support showing one pivot point allowing movement of the support up or down.

FIG. 15 is a partial section and view of the extension structure and footrest and leg rest pivotally connected by a swing arm support.

FIG. 16 is a partial section and view of the footrest/leg rest member connected to a seat member or seat support by a slide mount enabling the footrest/leg rest to be adjusted.

FIG. 17 is a pictorial view of the tray embodiment to contain various components for the unit or wheelchair of the invention, including one or more batteries and/or one or more circuit boards.

DETAILED DESCRIPTION OF THE INVENTION

Figure 1:
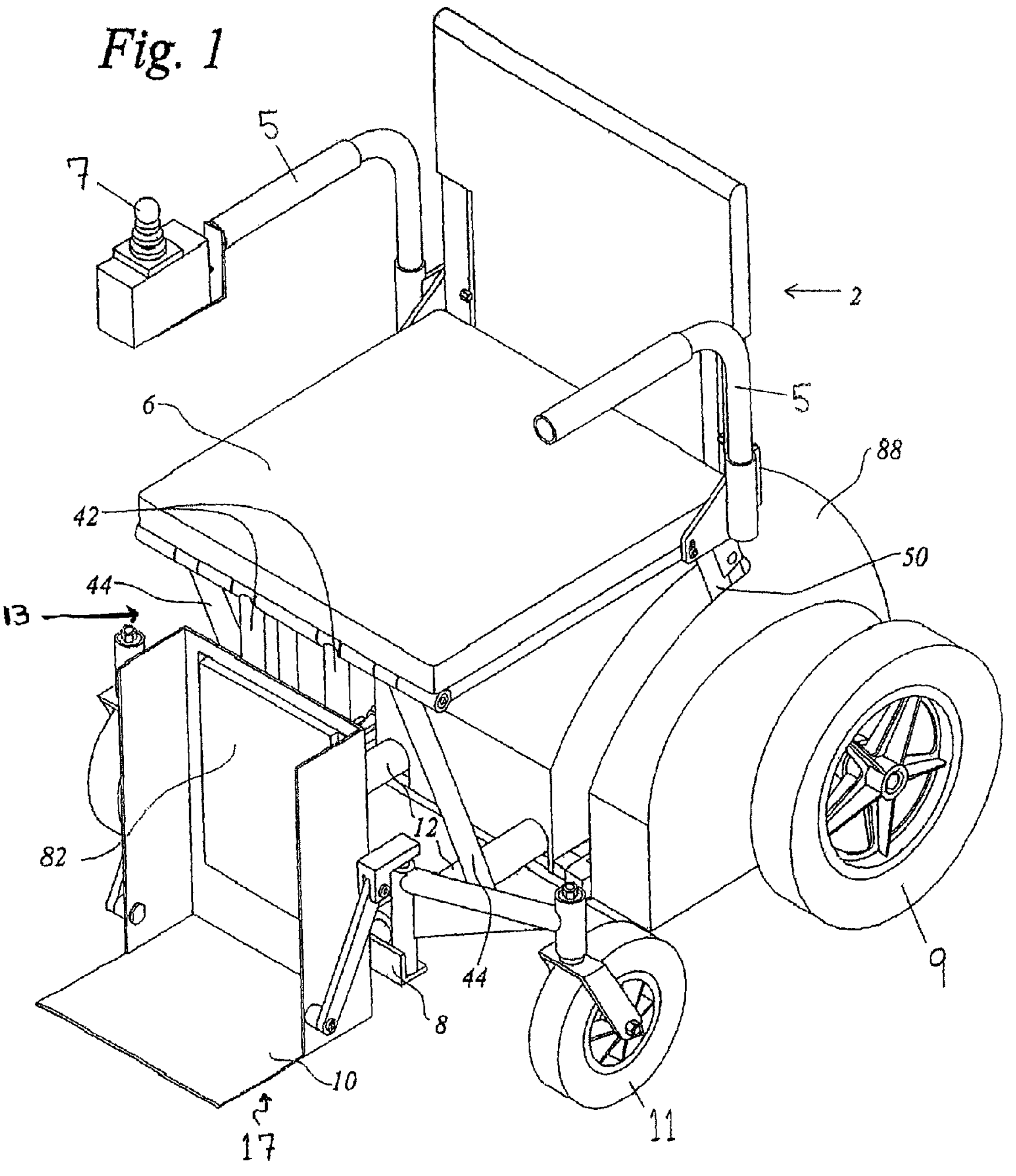
FIG. 1 is a pictorial view of one embodiment of the wheelchair or device of the invention in which the wheelchair is in the uppermost position, with the leg protection cover on the footrest member and the component cover on the main frame, both of which are removed on all other drawings to better show operation.
Figure 2:
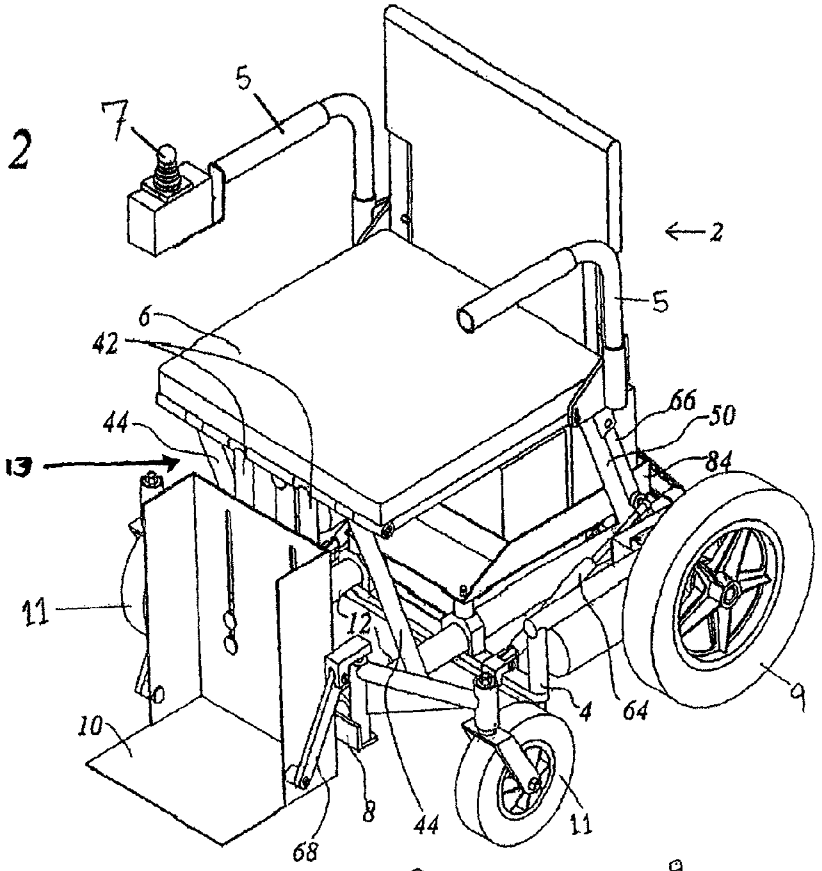
FIG. 2 is another pictorial view of one embodiment of the wheelchair or device of the invention in which the wheelchair is in the uppermost position.

The present invention relates in general to a wheelchair, a mobile unit, a vehicle, or another similar mobile device which provides stabilized transportation for one or more passengers. In one aspect of the invention, the height of the seat member may be adjusted preferably to raise or lower the user's position, and in a preferred aspect, the height of the seat member is lowered to provide more stable transportation for the user of the invention by lowering the center of gravity closer to the operating surface. In another aspect, the wheelchair, mobile unit, vehicle, or mobile device may be adjusted to increase or decrease the size of its footprint (or any part of the footprint), and in a preferred aspect, the footprint is enlarged to provide more stable transportation for the user of the invention. Both the height of the seat member and the size of the footprint (or any part of the footprint) may be adjusted to provide more stability.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications. While specific examples described may refer to a wheelchair, the invention may equally apply to any mobile unit, vehicle, or any other mobile device.

As depicted in FIGS. 1-5, wheelchair 2 of the present invention is basically comprised of base assembly 15 (further comprising extension structure 8 and main frame 4), seat assembly 13, and leg support assembly 17.

Base assembly 15 provides the base structural support for wheelchair 2. Base assembly 15 is comprised of extension structure 8 and main frame 4. In operation, a user can control extension structure 8 to extend away from or move toward main frame 4, increasing or decreasing the size of the footprint of wheelchair 2. As the footprint increases, the stability of wheelchair 2 increases, as the footprint decreases, the maneuverability of wheelchair 2 increases. By varying the footprint, a user can achieve the optimum balance of maneuverability and stability for a given situation. The components of base assembly 15 may be prepared of any material such as metal, plastic, wood and the like or combinations thereof, and can be designed in various configurations such as a frame, a solid platform and the like or combinations thereof. Preferably, base assembly 15 is made of aluminum, or other suitable durable, lightweight metal, such as chrome molly.

Figure 6:
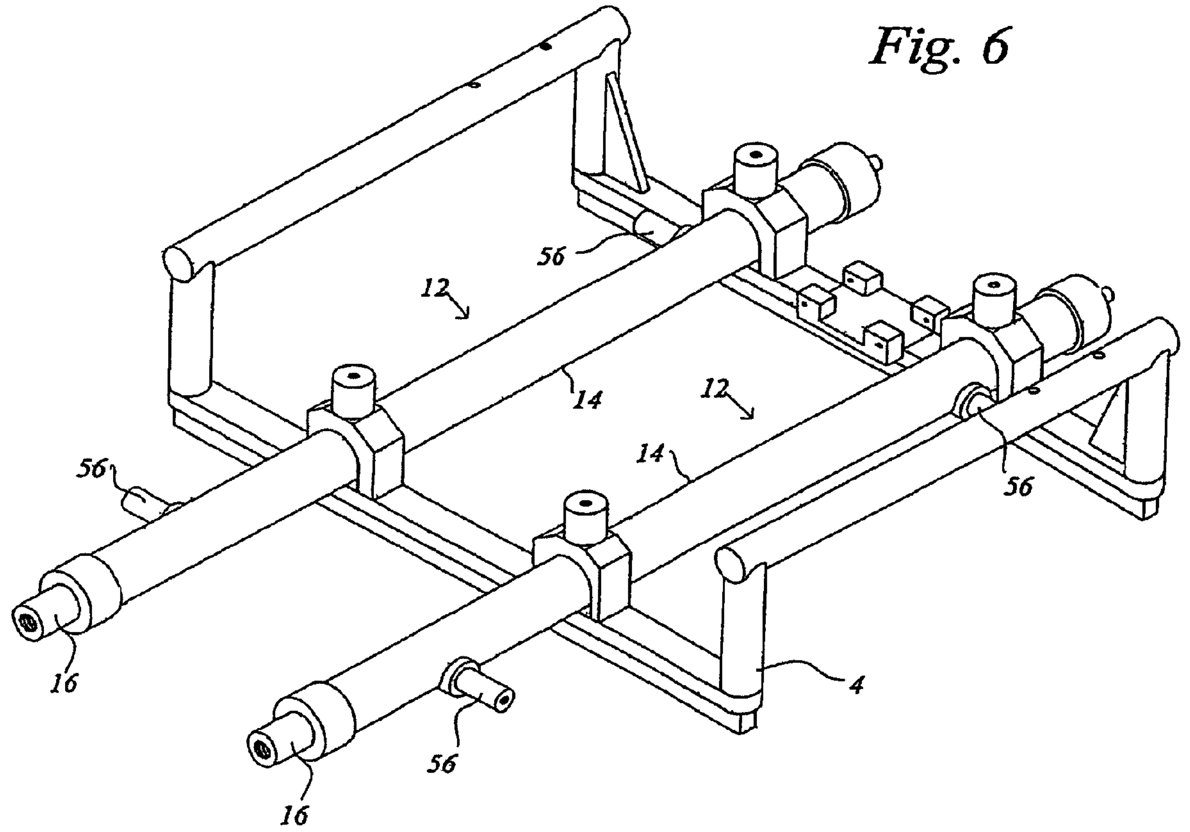
FIG. 6 is a pictorial view of one embodiment of the wheelchair or device of the invention showing the telescopic device operably secured to the main frame.
Figure 7:
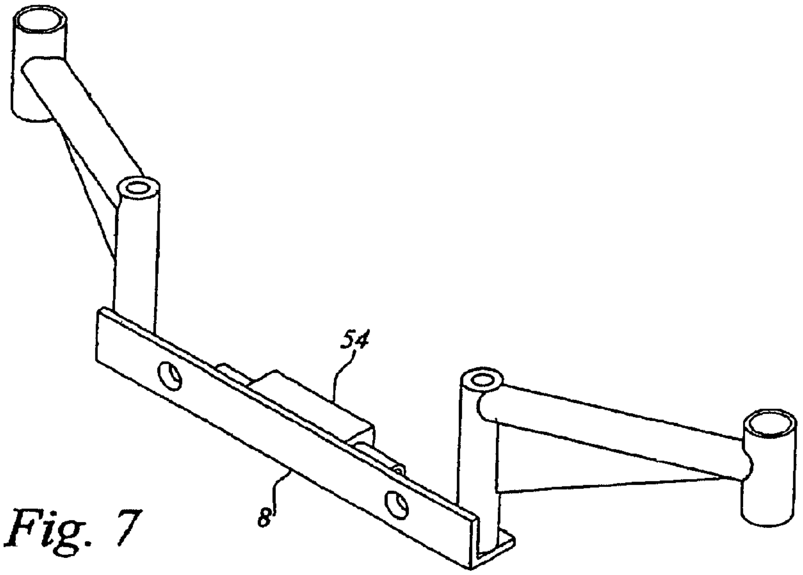
FIG. 7 is a pictorial view of one embodiment of the wheelchair or device of the invention showing the front portion of the base.

Extension structure 8 may be extended or retracted by utilizing telescopic devices 12, depicted in FIG. 6. Telescopic devices 12 allow part of the frame to extend or retract to increase or decrease the size of the footprint of the wheelchair or unit. Telescopic devices 12 may be extension/retraction tracks and/or extension/retraction rods and/or extenders that allow extension structure 8 to move away from or toward main frame 4 in such a manner to allow the overall footprint size of the base to increase or decrease. Extension structure 8 is secured operable to the main frame 4 by telescopic devices 12. Preferably extension structure 8 is made of the same or similar material as main frame 4. FIG. 7 shows the front portion of the base (which may comprise one or more wheels) and this portion of the base may be extended or retracted based on adjustment of the extension device or telescopic device. Adjusting the front portion of the wheelchair allows the footprint of the base to be increased when extended or decrease when retracted. Main frame 4 and extension structure 8 are supported by two rear wheel assemblies 9 and two front wheel assemblies 11, respectively. The substantially rectangular shape formed between the four wheel assemblies provides for a much more stable structure than would a triangular shape formed between three wheel assemblies. In yet another aspect, the base or platform comprises a plurality of wheel assemblies 9, 11 wherein wheel assemblies 9, 11 may be designed (including various shapes, sizes and/or tread configurations) to accommodate any terrain. In the embodiment shown in the figures, front wheel assemblies 11 and rear wheel assemblies 9 are utilized, but the invention may utilize any number of wheel assemblies, including at least two, at least three, at least four, at least five, at least six, at least seven, at least eight or more wheel assemblies, depending or the need. In another aspect, the size of the footprint of the base may be increased or decreased by extending or retracting one or more wheel assemblies 9, 11 which may be included as part of the base or platform configuration. For example, one or more wheel assemblies 9, 11 may be extended or retracted, for example, by utilizing one or more telescopic devices 12 that allow at least one wheel assembly 9, 11 to separate and move away from or toward the base or platform in such a manner to allow the overall footprint size of the base or platform to increase or decrease.

Figure 8:
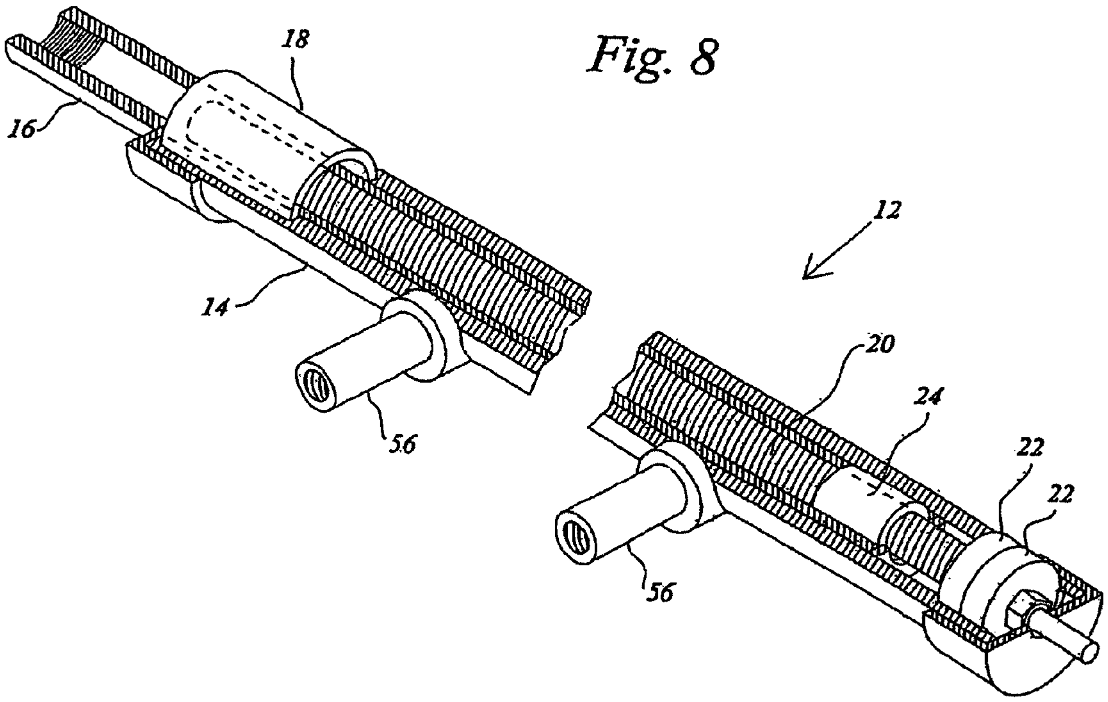
FIG. 8 is a partial section and view of a telescopic device of the device or wheelchair of the invention which when operated allows the footprint of the device or wheelchair to be increased (when extended) or decreased (when retracted).
Figure 9:
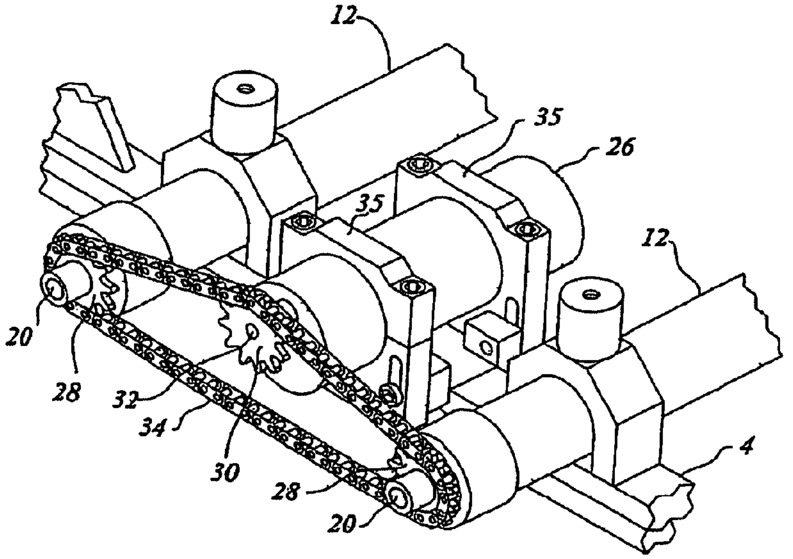
FIG. 9 is a partial section and rearward view of the telescopic device and the motor connected by a drive belt or chain for operation of the telescopic device.

Outer guide housings 14 of telescopic devices 12 are secured to main frame 8, and slide sections 16 of telescopic devices 12 are secured to extension structure 8. In addition to, or in place of telescopic devices 12, any other extending/retracting device or devices that are mechanical, electrical, pneumatic or hydraulic could be used, for example a screw cylinder, linear actuator, or total hydraulic system can be used to drive the extending/retracting device or devices. In one embodiment, depicted in FIGS. 6 and 8, slide section 16 moves through bearing(s) 18. Suitable bearings include a flanged or sleeve type journal bearing, a brushing, a fluid bearing, Rulon, Orlite, Frelon or other type linear bearings that give adequate support while substantially reducing sliding friction. Threaded shaft 20, similar to a jackscrew, is secured operable to outer guide housing 14 as by angular contact bearings 22 or other type thrust bearings. Female threaded member 24, which can be, for example, a nut, is secured to slide section 16 and adapted to move along threaded shaft 20 as that member rotates. A lubricant, such as grease, may be used on the threaded shaft to reduce friction. As shown in FIG. 9, motor 26, secured to main frame 4, transmits torque to gears 28 on threaded shafts 20 of telescopic devices 12 through gear 30 on motor shaft 32, via a belt, gear train, or chain 34. As threaded shaft 20 rotates, female threaded member 24 and slide section 16 move extension structure 8 away from or draw extension structure 8 to main frame 4. Adjustable motor brackets 35 achieve chain tension.

In another embodiment (not shown), motor 26 drives a worm gear, which in turn meshes with and drives the rotational motion of a pinion gear. The pinion gear in turn meshes with and drives the translational motion of a rack, as in a typical rack and pinion mechanism. The rack is secured to extension structure 8, and the translational motion of the rack moves extension structure 8 away from or draws extension structure 8 to main frame 4. Other mechanisms may also be used to translate power from motor 26 to telescopic devices 12.

In another embodiment, as discussed below with respect to FIGS. 18-21, the motion of extension structure 8 is controlled by a mechanism in which slide tubes controlled by a linear actuator replace the threaded shaft and female threaded member above. The slide tubes are connected at one end to main frame 4, and at the other end to extension structure 8. Activation of the linear actuator causes slide tubes to extend or retract, which moves extension structure 8 away from or toward main frame 4, respectively.

At least one seat may be attached to the seat member or seat support in such a manner that when operated, the seat is raised or lowered based on movement of the seat member or support. Components of seat assembly 13 connect to both extension structure 8 and main frame 4. Seat assembly 13 comprises at least one seat member 6, and in a preferred aspect, seat member 6 may be adjusted to provide more comfort and/or stability for the user. In a preferred aspect, seat member 6 may be adjusted up or down relative to the base or platform. Preferably, seat member 6 is lowered to provide more stability. Lowering seat member 6 according to the invention also provides better access to ground level activities and is more stable, which is useful for outdoor use, where the terrain may be more uneven and unpredictable, while increasing the height of seat member 6 provides better access to off the ground activities, such as easy access to table tops and counters and is more maneuverable, which is useful for indoor use, where turning tight corners and fitting through narrow doorways is a concern. In this manner, the single wheelchair can be used for a variety of activities, providing the user with a greater range of motion, and can operate both indoors and outdoors. In a preferred aspect of the invention, seat member 6 is lowered by moving it in the direction of the front of the unit or generally forward relative to the base or platform, preferably by pivoting seat member 6 such that it is lowered as it moves forward. In a different aspect, seat member 6 is lowered by moving it generally back relative to base or platform, preferably by pivoting seat member 6 such that it is lowered as it moves back. In another aspect, seat member 6 is lowered by moving it down with little or no general movement forward or backward relative to the base or platform.

Seat assembly 13, depicted in FIG. 10, which in operation lowers or raises seat member 6 as described above, is a rigid, yet operable framework. Much of this framework is made up of preferably aluminum tube stock or other suitable durable, lightweight metal such as chrome molly, but can also be steel, fiber, wood, plastic, metal, any other material with suitable functional qualities, or any combination thereof. Seat member sides 36 are secured to and conjoined by axle rods 38 and 40, as shown in FIGS. 11 and 12. At least one seat member 6 may be attached to seat member sides 36. Seat member links 42 and 44 are pivotally secured to axle rod 38 and maintained in a uniform manner by spacers 46 and 48, depicted in FIG. 11. Seat member links 50 are pivotally secured to axle rod 40 and maintained in a uniform manner by spacer 52, depicted in FIG. 12. Seat member 6 is coupled to telescopic devices 12 and extension structure 8 by seat member links 42, 44 and 50, depicted in FIG. 13. Seat member links 44 and 50 are pivotally secured to outer housing guides 14 of telescopic devices 12 by four connecting pins 56, which can be pins, bolts, rivets, radial bearings, or any other suitable connection mechanism, best depicted in FIG. 6. Seat member links 42 are pivotally secured to a pin block 54 on extension structure 8, depicted in FIG. 7. Connecting pins 56 on outer housing guides 14 of telescopic devices 12 and pin block 54 on extension structure 8 are anodized to prevent wear. Pivotal connections 58 of seat member links 42, 44 and 50 contain brass bushings 60, or other type bushings or bearings, and bushings 62, made of an engineering plastic, such as that available from DuPont under the tradename DELRIN, or other type bushings or bearings are placed at the sides of pivotal connections 58 to prevent binding and galling when the seat is raised or lowered.

Figure 13:
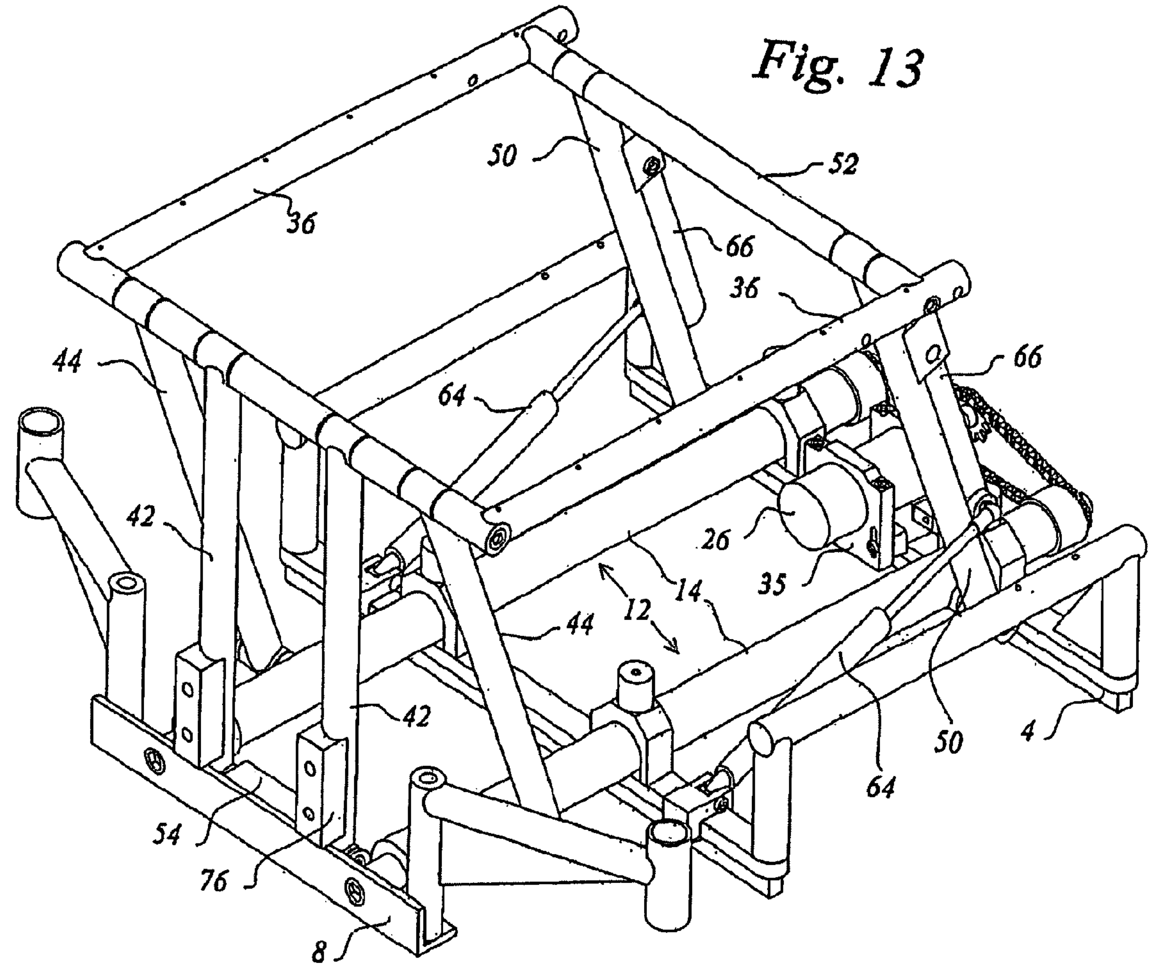
FIG. 13 is a pictorial view of one embodiment of the operating mechanism showing the motor, the extender(s) (or telescopic device), the seat support and the base adjuster.

Due in part to the formation of seat assembly 13 and the pivotal connections of seat assembly 13 to extension structure 8 and main frame 4 (through the pivotal connections on telescopic devices 12), as base assembly 15 operates to move extension structure 8 away from or toward main frame 4, this motion drives a transition in seat assembly 13 which causes seat member 6 to move forward and down or backward and up, while maintaining a horizontal surface. In this manner, the footprint size may increase or decrease simultaneously, or otherwise in synchronization, as seat member 6 raises and lowers. As shown in FIG. 13, by operation of the motor, the extenders may be extended or retracted and such extenders are operably linked to the seat support and the front of the base (the wheel configuration of the base). As the extenders are extended or lengthened, the seat support pivots in such a manner as to allow the seat support to move forward so that the support is lowered. The lengthening of the extenders also allows the base front (the wheel configuration of the base) to be extended thus increasing the footprint of the base. This operation will be explained in greater detail below.

Figure 14:
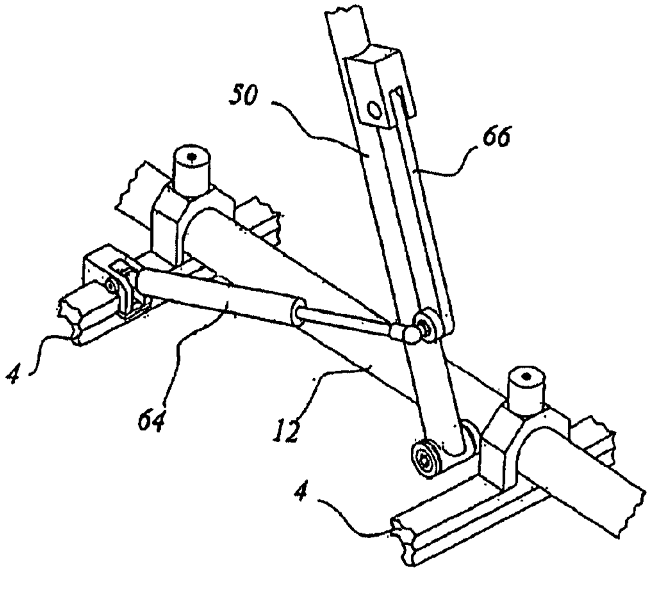
FIG. 14 is a partial section and rearward view of an optional lifting assist device connected to the main frame (or platform) and a seat member or seat support.
Figure 18:
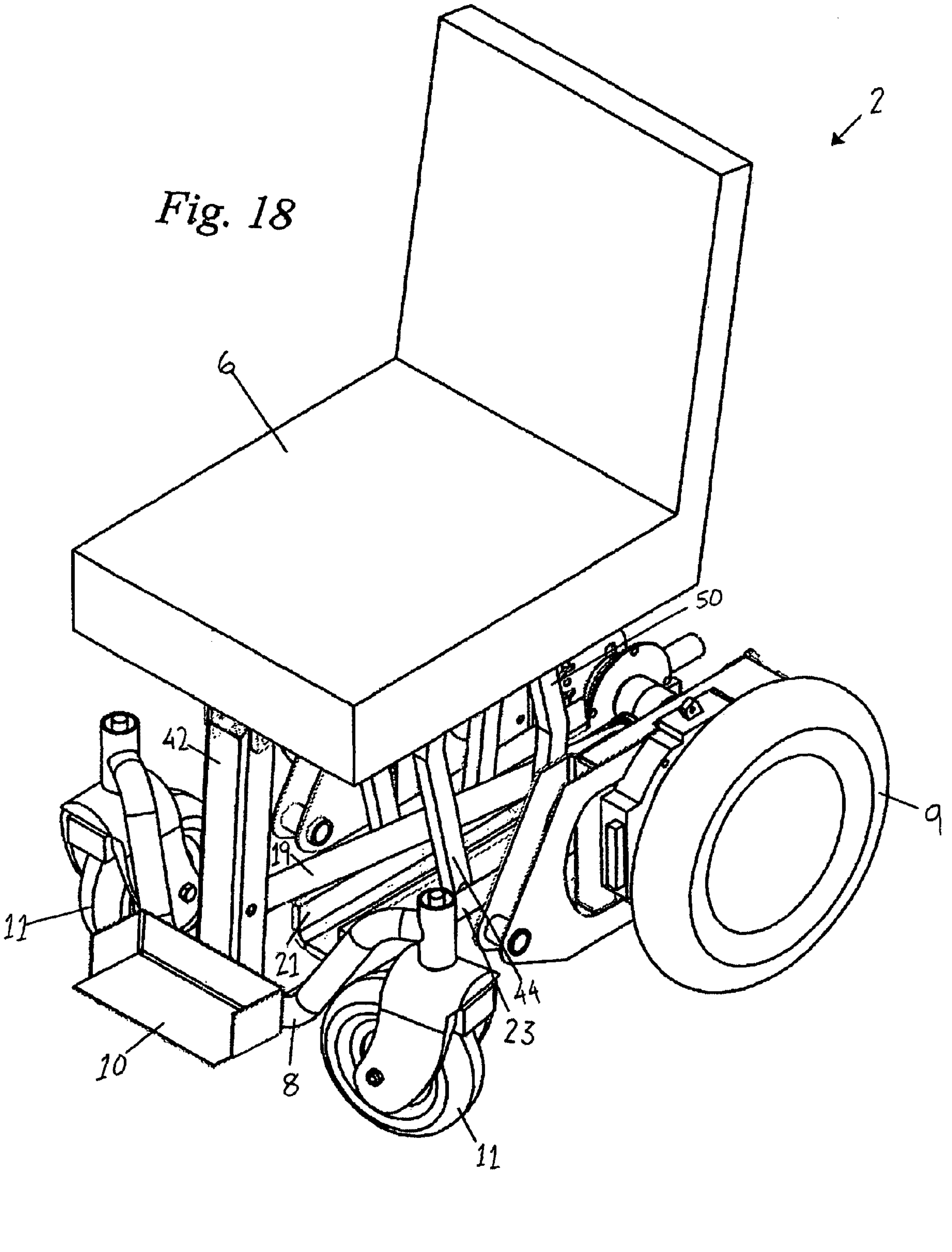
FIG. 18 is a pictorial view of another embodiment of the wheelchair in an upright position, in this embodiment a linear actuator is used to extend or retract the device.
Figure 19:
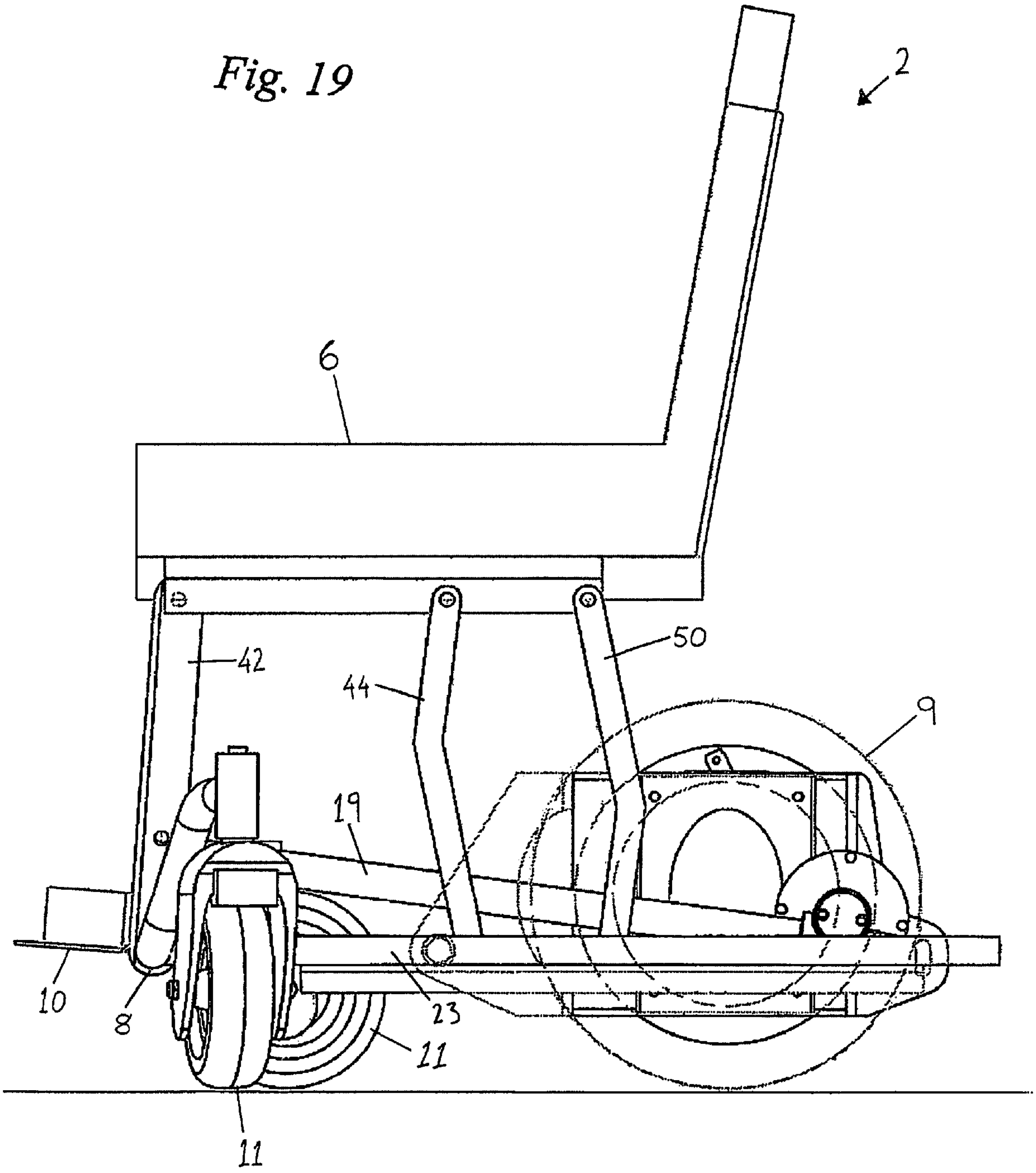
FIG. 19 is a side view of another embodiment of the wheelchair in an upright position, in this embodiment a linear actuator is used to extend or retract the device.
Figure 20:
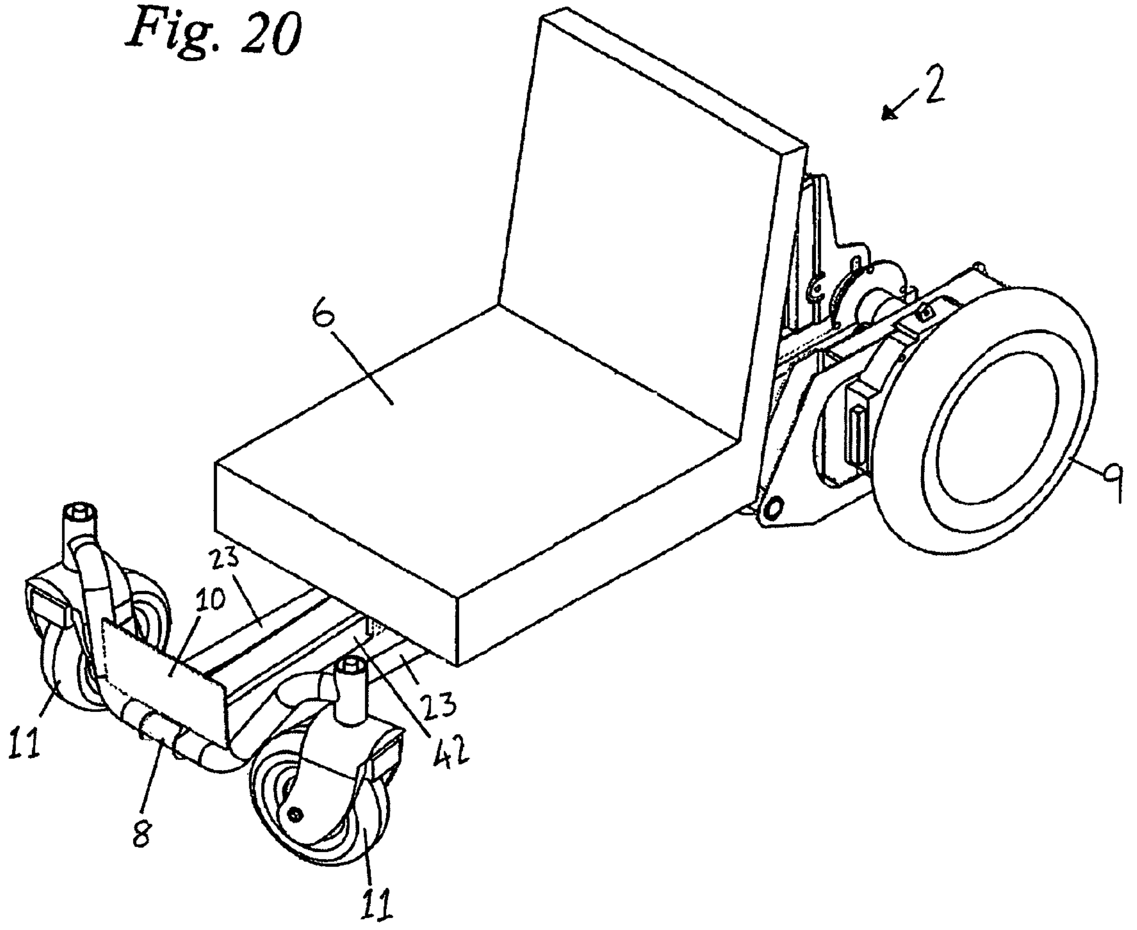
FIG. 20 is a pictorial view of another embodiment of the wheelchair in a lowered position, in this embodiment a linear actuator is used to extend or retract the device.
Figure 21:
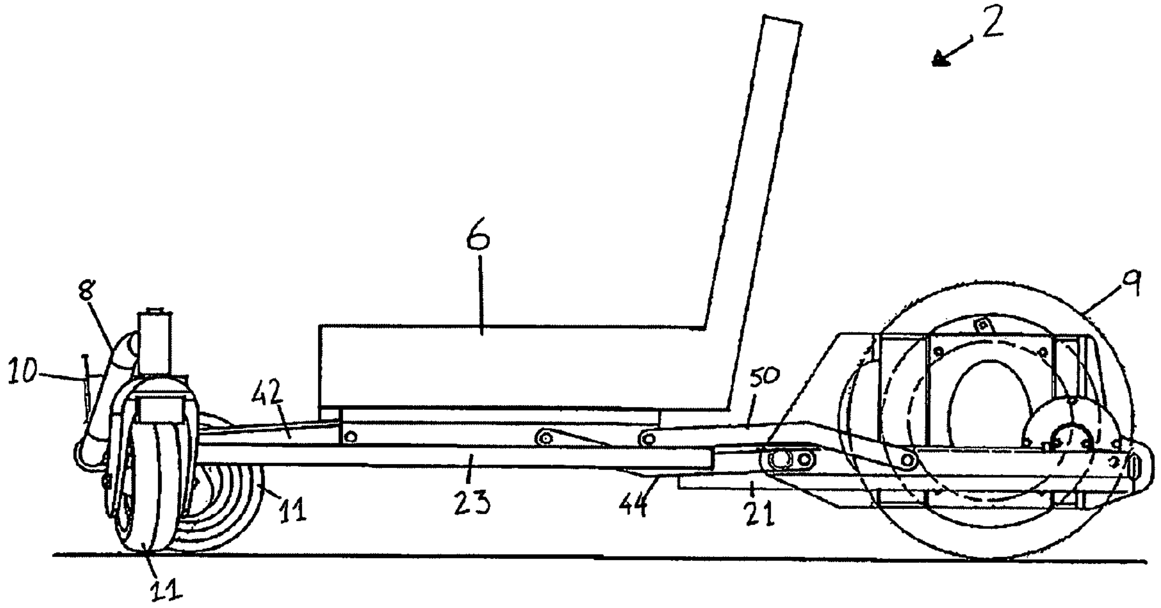
FIG. 21 is a side view of another embodiment of the wheelchair in a lowered position, in this embodiment a linear actuator is used to extend or retract the device.

Due to an occupant's bodyweight, when seat member 6 is in a lower position, a large amount of torque is needed from motor 26, and deflection problems of seat member links 42, 44 and 50 may occur when lifting seat member 6. In FIG. 14, a gas spring cylinder 64 or cylinders is used to assist lifting. Gas spring cylinder 64 may also be a torsion spring. Gas spring cylinders 64 could also be a spring mechanism, a hydraulic mechanism, or any other suitable lifting mechanism. Gas spring cylinder 64 provides additional force to assist seat member links 50 (occupied or not occupied by a user) to move up, thus raising seat member 6. One or more gas spring cylinders 64 may be used according to the invention depending on the need. Gas spring cylinders 64 are pivotally secured to main frame 4 and to swing arms 66 pivotally secured to seat member links 50.

Depicted in FIG. 15, leg support assembly 17 is comprised of leg rest member 10, swing arms 68, spacers 70, and protection cover 82. Alternatively, leg rest member 10 can be a bent-tube type leg rest. Leg rest member 10 is pivotally secured to extension structure 8 by swing arms 68 and pins 74 connected to slide blocks 76. A spacer 70, made of an engineering plastic, such as that available from DuPont under the tradename DELRIN, is used on the sides of pivotal connections 72 of swing arms 68 to prevent seizing and galling. Pins 74, best depicted in FIG. 16, are securely attached to slide blocks 76 on seat member links 42 and travel through parallel slots 78 on leg rest member 10. Washers 80, made of an engineering plastic, such as that available from DuPont under the tradename DELRIN, are used on the front and rear of parallel slots 78 of footrest member 10 to prevent binding and galling. Protection cover 82 is secured to footrest member, depicted in FIG. 1, over parallel slots 78 and pins 74 on slide block 76, to prevent injury to the occupant's legs. As the front portion of the unit extends, the footrest/leg rest pivots preferably in a flat or horizontal position or substantially flat or substantially horizontal position. In addition to, or in place of swing arms 68 and slide blocks 76, any other extending/retracting device or devices that are mechanical, electrical, pneumatic or hydraulic could be used, for example a screw cylinder, linear actuator, or hydraulic system can be used to drive the extending/retracting and pivoting motions of leg rest member 10. In operation, which is discussed in greater detail below, leg support assembly 17 protects and guides a user's legs throughout motion of wheelchair 2, in such a way as to maintain comfort and facilitate independent operation by the user, without assistance from others.

In another embodiment, the position of leg rest member 10 is controlled by a linear actuator between seat 6 and leg rest member 10. A linear bearing and rod are attached to each of seat member links 42. In this embodiment, due to the force of the linear bearing and rod throughout the transition, leg rest member 10 extends and pivots to allow a user's legs to lay flat as seat 6 changes from an upper position to a lower position, and leg rest member retracts and pivots to allow a user's legs to bend at the knee as seat 6 changes from a lower position to an upper position. As shown in FIGS. 18-21, extension structure 8 extends from main frame 4 driven by linear actuator 19. Linear actuator 19 is pivotally connected at one end to seat member link 42, and pivotally connected at the opposite end to main frame 4. In this embodiment seat member link 42 is forced away from or toward main frame 4 by the linear motion of linear actuator 19. As seat member link 42 moves, it pivots at the point of connection with linear actuator 19, and in a fully extended state, seat member link 42 lays over linear actuator 19 to provide additional stability. Actuator support member 21 is attached to main frame 4, and is shaped to accommodate linear actuator 19 axially. When linear actuator 19 extends it pivots at the point of connection with main frame 4 and lays itself into the recess in actuator support member 21, providing additional support and stability for wheelchair 2. Extension support members 23 are attached to extension structure 8 at one end, and main frame 4 at the opposite end. During the extension/retraction of linear actuator 19, extension support members 23 extend or retract accordingly, in order to provide support on each side of wheelchair 2.

In one embodiment, the relative movement of the base (or one or more wheel assemblies 9, 11 as part of the base configuration) and the lowering of seat member 6 allows the center of gravity of the user/unit combination to be lowered and thus provides more stability for the operation of wheelchair 2 by the user. In one aspect, the combination of lowering the seat and increasing the size of the footprint allows the user to sit in a relatively flat position. Preferably the operation of the invention allows the legs of the user to be extended (preferably the legs being flat or substantially flat). Leg rest member 10 supports the legs and feet of the user throughout the transitions of wheelchair 2. Leg rest member 10 is shaped in such a way so as to retain and guide the legs of the user through the transitions, which is a key feature especially for an individual without internal control of his or her legs, such as a paralyzed individual. This feature of the invention allows the user's legs to extend in such a manner as to provide comfort to the user and/or increase blood circulation in the user's legs. It assists in transitioning the position of the user's body without requiring him or her to leave wheelchair 2.

Since electrical components are used in the present application, battery or batteries tray 84 and circuit board tray 86, depicted in FIG. 17 are secured to main frame 4. Batteries tray 84 and circuit board tray 86 may be removable for service and repair, and may be replaceable. In FIG. 1, cover 88 is secured to main frame 4 to protect the occupant from pinch points when seat is being raised or lowered and the electrical components from the environment.

In preferred embodiments of the invention, both the seat adjustment and the footprint size adjustment may be operated simultaneously or separately. Preferably, seat member 6 is lowered as the size of the footprint is increased and this operation provides the unit with more stability during operation. In one aspect, seat member 6 is lowered by moving it forward relative to the base, and the front of the base, extension structure 8, is extended. In another aspect (not shown), seat member 6 is lowered by moving it back relative to the base, and the back of the base (or one or more wheel assemblies 9 of the base configuration) is extended. In a different aspect (not shown), the chair may be lowered backwards while the front of the base, extension structure 8, (or one or more wheel assemblies 11 of the base configuration) is extended. In a related aspect (not shown), seat member 6 may be lowered by moving it forward while the back of the base (or one or more wheel assemblies 9 of the base configuration) is extended. As will be apparent, one or multiple parts of the base (or one or more wheel assemblies 9, 11 of the base) may be extended as seat member 6 is adjusted.

Operationally, wheelchair 2 components are able to move relative to one another in order to change the size and shape of the footprint of wheelchair 2, as well as change the height of seat member 6 relative to a surface on which wheelchair 2 is operating. In combination these functions allow an operator to use wheelchair 2 while sitting upright, or while reclining, and to change between these positions.

For explanatory purposes, the fully upright formation of wheelchair 2 (depicted in FIGS. 1, 2, and 4) is referred to as Position A, while the fully reclined formation of wheelchair 2 (depicted in FIGS. 3 and 5) is referred to as Position B. Also for explanatory purposes it is assumed that wheelchair 2 begins in Position A.

In Position A, seat member links 42 are substantially vertical, while seat member links 44 form an acute angle with seat member links 44. Seat member links 50 remain substantially parallel with seat member links 44, forming a four-bar mechanism with seat member sides 36 as the connecting link. A user in wheelchair 2 while it was in Position A would be sitting upright, legs resting within leg rest member 10, bent at the knees, for example, at an angle approximating 90 degrees, such as at an angle within 20 degrees of 90 degrees (e.g. 70, 80, 90, 100 or 110 degrees).

Upon activation of motor 26, motor 26 drives rotation of threaded shaft 20. As threaded shaft 20 rotates, female threaded member 24 is forced along threaded shaft 20, in an axial direction moving away from motor 26. The axial motion of female threaded member 24 drives slide section 16 and extension structure 8 away from main frame 4, increasing the footprint of wheelchair 2 as it does so. Wheel assemblies 11 move with and support extension structure 8 during this transition. Seat member links 42 are pivotally attached a pin block 54 on extension structure 8.

As extension structure 8 moves away from main frame 4, the angle between seat member links 42 and seat member links 44 increases, as does the distance between pin block 8 and main frame 4. This motion draws seat member links 44 and 50 to rotate forward, about fixed pivot points at connecting pins 56. This rotation forces seat member sides 36 forward and down, while remaining substantially horizontal, ensuring that the operator, who is seated on seat member 6 which bridges seat member links 36, will remain safely and comfortably in place while seat member 6 is lowered.

While seat 6 transitions in this manner, leg support assembly 17 extends away from seat member 6 and pivots along with the user's legs at the knee, as the user's legs extend, increasing the angle between the lower leg and upper leg, as that angle approaches 180 degrees. Throughout the transition, swing arm 68, pins 74 and slide blocks 76 maintain support for and control of the user's legs, ensuring that the transition occurs ergonomically, comfortably and safely for the user.

Figure 3:
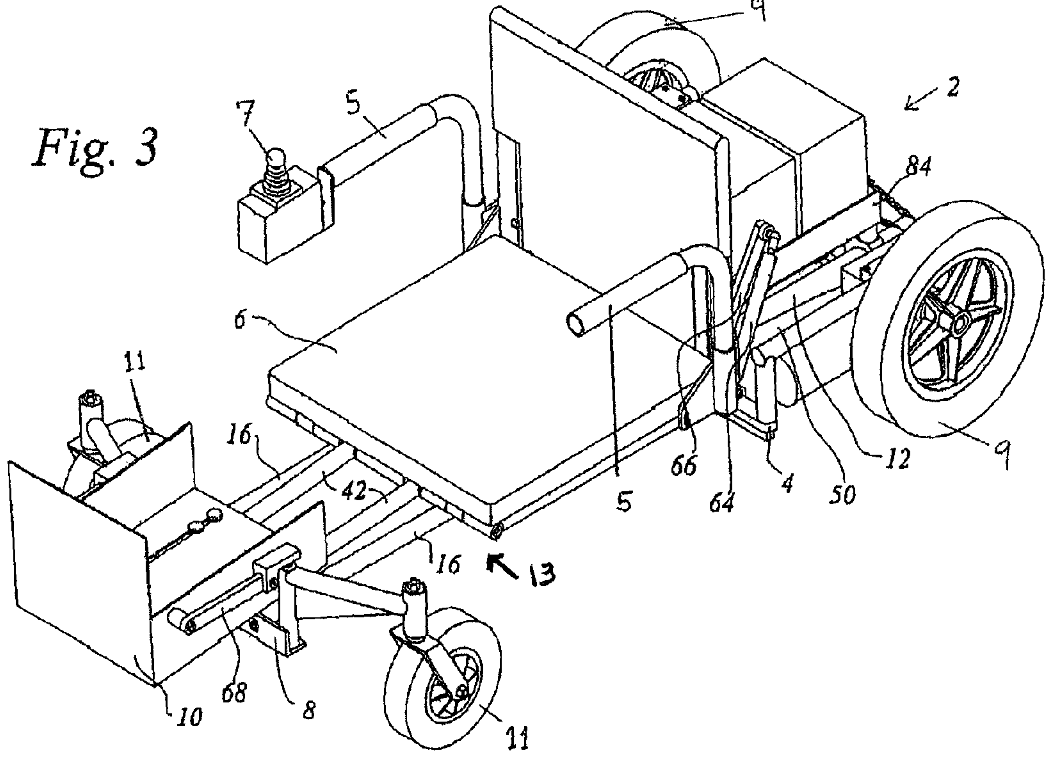
FIG. 3 is a pictorial view of one embodiment of the wheelchair or device of the invention in which the wheelchair is in the lowest position.
Figure 4:
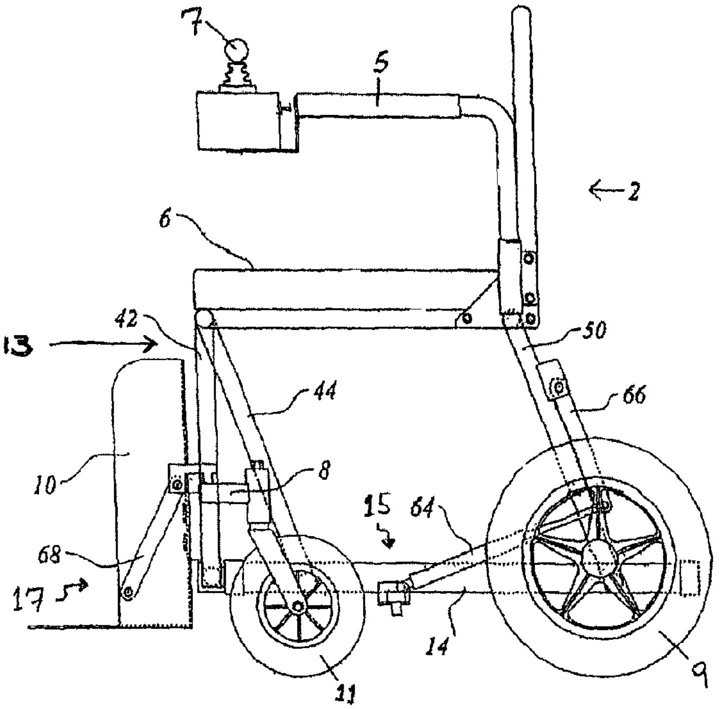
FIG. 4 is a schematic representation of one embodiment of the wheelchair or device of the invention showing the operating mechanisms with the wheelchair in the uppermost position.
Figure 5:
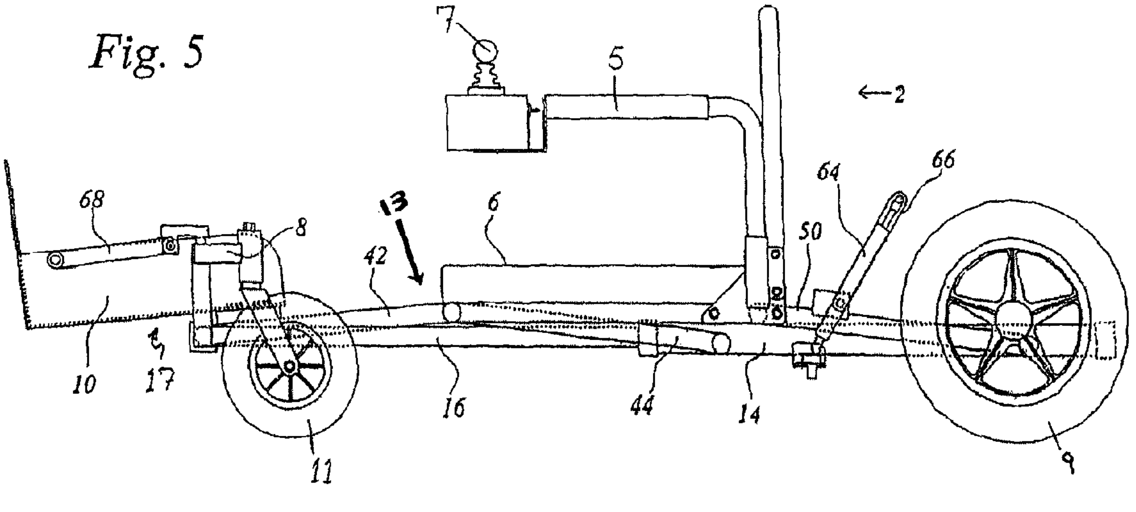
FIG. 5 is a schematic representation of one embodiment of the wheelchair or device of the invention showing the operating mechanisms with the wheelchair in the lowest position.

Once extension structure 8 is fully extended, wheelchair 2 is in Position B, as depicted in FIG. 3. In this position, the front of the device (including the front wheels) is moved forward and the seat is lowered (preferably the seat pivots forward as it is lowered). In a preferred aspect, the distance between the footrest and the seat in the down position is such that the legs of a user will lay flat to provide for better blood circulation. In position B, because leg rest member 10 travels away from main frame 4 with extension structure 8, a user's legs are fully extended, for example, the angle between the upper and lower legs in this position may be substantially 180 degrees, such as within 20 degrees of 170 degrees (e.g. 150, 160, 170 or 180 degrees), and the user is in a seated-reclined position. In position B seat member 6 is at its lowest, and the footprint is at its largest. The two wheel assemblies 11 are fully extended at their farthest distance from the two wheel assemblies 9, resulting in maximum stability. In a preferred aspect, the distance between the footrest and the seat in the down position is such that the legs of a user will lay flat to provide for better blood circulation. In Position B, seat member links 42, 44, and 50 are nearly horizontal, however they retain a sufficient angle from horizontal so as to facilitate the transition from Position B to Position A by way of the driving horizontal force of extension structure 8, to help prevent deflection or binding of the structure. Additionally, gas spring cylinders 64 assist in returning seat member links 42, 44, and 50 to Position A, by introducing a force along the body of seat member links 50. In so doing, gas spring cylinders 64 also decrease the amount of torque that must be supplied by motor 26 in order to initially draw extension structure 8 toward itself.

While in Position B wheelchair 2 of the preferred embodiment is in its most stable position. By rotating seat assembly 13 forward and down, and at the same time extending extension structure 8 forward, the result is to place the center of gravity centrally between wheel assemblies 9 and 11, as well as to lower the center of gravity toward the operating surface or ground.

When it is desired to transition from Position B to Position A, wheelchair 2 is operated such that threaded shaft 20 rotates in the opposite direction as when transitioning from Position A to Position B. This causes female threaded member 24 to travel back along threaded shaft 20 axially toward motor 26, which draws extension structure 8 toward main frame 4, and drives a reversal of the above-described motions of seat member links 42, 44, and 50, so that the angle between seat member links 42 and 44 decreases, and seat member links 44 and 50 rotate backward about connecting pins 56, until all components have returned to the initial state of Position A.

Throughout this cycle, seat member sides 36 remain substantially horizontal, allowing a user to transition from Position A to Position B and back again while remaining seated on seat member 6. Additionally, either transition (from Position A to Position B or from Position B to Position A) can be interrupted at an intermediate position and either reversed or held at that position if the user desires to use wheelchair 2 in such a formation.

Also throughout this cycle, the user is retained within the confines of wheelchair 2 in part by armrests 5 and leg rest member 10. This is particularly important for a user who may have diminished control of his or her body. He or she may desire to change positions for any reason, including comfort, functionality, or for medical reasons, as discussed above. Armrests 5 will help to retain the torso and upper body of the user in place, while leg rest member 10 will help to retain the legs and lower body of the user in place. The particularized guidance that leg rest member 10 provides for the user's legs throughout this cycle is of pivotal importance, as it plays a significant part in the autonomy of the device, and allows the user to control the position of his or her legs through external means by activating the mechanisms of wheelchair 2, when that user may not be able to control the position of his or her legs on his or her own. Because of the potential for injury while moving, leg rest member 10 is shaped such that it will protect the legs, and additionally provides for protection cover 82 to further prevent injury.

Also throughout the cycle, battery or batteries tray 84 and circuit board tray 86 remain in a fixed position relative to main frame 4. This results in increased stability and operative simplicity as opposed to a system where battery or batteries tray 84 and/or circuit board tray 86 would be required to change position in order to accommodate the motion of the mechanisms during a transition.

At Position A or Position B, or any point while fixed or in transition in therebetween, the wheelchair 2 may be operated to travel in either a substantially forward or reverse direction by way of the drive wheels, which are preferably rear wheel assemblies 9. Rear wheel drive provides greater stability and control. Wheelchair 2 may be powered or moved manually by an individual or user or may be motorized by one or more driving motors (not shown). Such motors may be electric and/or combustion motors or combinations thereof. In yet another aspect, any one or a number of wheel assemblies 9, 11 of the device may be powered by such one or more driving motors and preferably the unit of the invention is a multi-wheel drive unit, wherein a number or all of wheel assemblies 9, 11 of the unit are driven by one or more driving motors. Preferably, the device of the invention comprises four (4) wheel assemblies 9, 11 and preferably at least two of such wheel assemblies 9, 11 (and preferably all four) are capable of being driven by one or more driving motors. In another embodiment, one or more motors 26 of the invention are utilized to raise and/or lower all or any part of the unit. In another aspect, one or more motors 26 are utilized to increase and/or decrease the size of the footprint of the unit (or any part of the unit). In another embodiment, the same or different motors may be used to operate all or any number of the functions of the unit, and in a preferred aspect one motor 26 is utilized to move the device, to increase and/or decrease the size of the footprint (or any part of the footprint) and to raise and/or lower all or any part of the unit.

In utilizing wheelchair 2, the different functions of the device may be operated separately or simultaneously depending on the need of the user. When one or more motors provide operation of any or all of the features of the unit, the unit may also comprise one or more control devices 7 allowing the user to control and operate the different features of the invention. For example, one or more control devices 7 may be used to move wheelchair 2, adjust the size of the footprint, and/or adjust the height of the unit and/or adjust the center of gravity.

The present invention provides a number of advantages. In one aspect, the invention prevents the unit from tipping over during use on different types of terrain and in general the invention allows the user to perform a wider range of activities and provides a means by which a user can access a variety of places, some of which may have been previously difficult to reach. The invention also provides more comfort to the user and importantly may address medical concerns for certain individuals by for example allowing better circulation in lower extremities and preventing stiffness. The device decreases the amount of assistance from others that the user will need by allowing the user to autonomously change positions and thus prevent stiffness, and improve circulation, as well as improve the quality of life of the user by allowing him or her to operate more independently.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A wheelchair comprising a plurality of wheels, a base, a seat member, and a leg support assembly, wherein the base comprises a main frame and an extendable member telescopically received in a front portion of the main frame, the leg support assembly is pivotably connected to the extendable member, the length of said base is configured to be increased by extending the extendable member from the front portion of the main frame and decreased by retracting the extendable member into the front portion of the main frame, the height of the seat member is configured to be increased or decreased, and the leg support assembly pivots along with a user's legs at the knees, as the leg support assembly extends away from the seat member and the user's legs extend.

2. The wheelchair of claim 1, wherein the base comprises four wheels.

3. The wheelchair of claim 2, wherein the four wheels comprise two wheels operably connected to the extendable member.

4. The wheelchair of claim 3, wherein the extendable member is operably connected to at least one extender device.

5. The wheelchair of claim 4, wherein the base is lengthened when said at least one extender device is extended.

6. The wheelchair of claim 5, wherein the seat member is configured to be lowered when said at least one extender device is extended.

7. The wheelchair of claim 2, wherein the seat member is operably connected to at least one extender device.

8. The wheelchair of claim 7, wherein the seat member is configured to be lowered when said at least one extender device is extended.

9. The wheelchair of claim 8, wherein said seat member is configured to pivot forward as the seat member is lowered.

10. The wheelchair of claim 8, wherein said seat member is configured to pivot backward as the seat member is lowered.

11. The wheelchair of claim 2, wherein the seat member comprises a seat.

12. The wheelchair of claim 2, wherein said wheelchair further comprises at least one motor operably connected to the main frame.

13. The wheelchair of claim 12, wherein said motor is configured to adjust the length of the base, the height of the seat member, or both.

14. The wheelchair of claim 1, wherein said wheelchair further comprises at least one lifting assist device operably linked to said seat member.

15. The wheelchair of claim 1, wherein said leg support assembly comprises a footrest.

16. The wheelchair of claim 1, wherein the extendable member is operably connected to an extender device, and the leg support assembly is configured to be extended when said extender device is extended.

17. The wheelchair of claim 1, wherein said leg support assembly is configured to be in a substantially horizontal position when said extendable member is extended.

18. The wheelchair of claim 17, wherein said wheelchair comprises a motor and the motor is configured to adjust the length of said base, the height of the seat member, the footrest, or a combination thereof.

19. A wheelchair comprising:

a plurality of wheels;

a base, wherein the base comprises a main frame and an extendable member telescopically received in a front portion of the main frame, and the size of the base is configured to be increased by extending the extendable member from the front portion and decreased by retracting the extendable member into the front portion;

a seat member pivotally connected to said base such that the height of said seat member is configured to be increased or decreased;

a leg rest pivotally connected to said base and configured to be extended away from and retracted toward the seat member, wherein said seat member is pivotable to a decreased height position and said leg rest is extendable upon increasing the size of the base; and a drive system configured to pivot the leg rest along with a user's legs at the knees, as the leg rest extends away from the seat member and the user's legs extend.

20. The wheelchair of claim 19, wherein said seat member is configured to be pivoted forward relative to said base upon decreasing the height of the seat member.

21. The wheelchair of claim 19, wherein said leg rest is configured to be extended in synchronization with the pivoting of said seat member to said decreased height position.

22. The wheelchair of claim 19, wherein at least two of said plurality of wheels are operably connected to said leg rest such that said at least two of said plurality of wheels extend when said leg rest is extended.

23. The wheelchair of claim 19, wherein said leg rest is pivoted from a vertical position to a horizontal position when said leg rest is extended.

24. A wheelchair comprising four wheels, a base, a seat member, a leg rest, and a drive system, wherein the base comprises a main frame and an extendable member telescopically received in a front portion of the main frame, the leg rest is pivotably connected to the extendable member, the base is adjustable between at least a first position and a second position such that the size of the base of the wheelchair may be increased from said first position to said second position by extending the extendable member from the front portion of the main frame of the base or decreased by retracting the extendable member into the front portion of the main frame of the base, the seat member is adjustable between at least a first position and a second position such that the height of said seat member may be decreased by adjusting from said first position to said second position, said first position of said base and said first position of said seat member are configured to position a user in an upright bent-knee seated position, and said second position of said base and said second position of said seat member are configured to position a user in a reclined straight-leg seated position, and the drive system is configured to pivot the leg rest along with a user's legs at the knees, as the leg rest extends away from the seat member and the user's legs extend.

* * * * *